Nov. 5, 1940.　　J. B. HADAWAY　　2,220,234
FISHING ROD HOLDER
Filed Dec. 9, 1937　　3 Sheets-Sheet 1

Inventor.
John B. Hadaway
by his attorneys
Fish, Hildreth, Cary & Jenny

Nov. 5, 1940. J. B. HADAWAY 2,220,234
FISHING ROD HOLDER
Filed Dec. 9, 1937 3 Sheets-Sheet 2

Inventor.
John B. Hadaway
by his attorneys
Fish, Hildreth, Cary & Jenney

Nov. 5, 1940.  J. B. HADAWAY  2,220,234
FISHING ROD HOLDER
Filed Dec. 9, 1937  3 Sheets-Sheet 3

Inventor.
John B. Hadaway
by his attorneys
Fish, Hildreth, Cary & Jenney

Patented Nov. 5, 1940

2,220,234

UNITED STATES PATENT OFFICE 2,220,234

FISHING ROD HOLDER

John B. Hadaway, Swampscott, Mass.; Florence S. Hadaway, executrix of said John B. Hadaway, deceased Application December 9, 1937, Serial No. 178,917

7 Claims. (Cl. 248—42)

The present invention relates to fishing rod holders, and more particularly to a holder for supporting a fishing rod on the gunwale of a boat, or on a seat or other structure.

It is a common practice for fishermen, when trolling alone, to position the rod with the tip extending over the side or gunwale of the boat or canoe and the butt held by the legs or hip, leaving the hands free to row or paddle. This method of holding the rod is most unsatisfactory, not only because of the insecurity of the support, a sudden bite of a fish or the catching on a snag often jerking the rod out of control and sometimes overboard, but further, because of the inability of the fisherman to move his legs or body to any appreciable extent without dislodging the rod or losing control of it.

Attempts have been made to provide fishing rod holders which could be attached to the gunwale or seat or other part of a boat to hold the rod extended over the side while the arms and legs of the fisherman were entirely free, but such devices as heretofore constructed have all been defective in one or more particulars. Some would not receive a rod equipped with the usual reel. Others did not hold the rod with sufficient security to prevent dislodgement and perhaps loss of the rod in the event of a heavy strike or catch on a snag. Still others did not afford the desired facility of insertion of the rod in the holder and particularly of its removal therefrom in the event of a strike.

It is the object of the present invention to provide a fishing rod holder which will avoid these objections and which will hold reel-equipped rods of varying sizes securely in any desired position on the gunwale of a boat or other structure without the possibility of displacement or loss of the rod, at the same time providing for its quick and easy insertion into, and removal from, the holder by a simple and natural motion of the hand and wrist.

To the above ends the present invention consists in the rod holder therein described and more particularly defined in the appended claims.

Figures 1, 4:
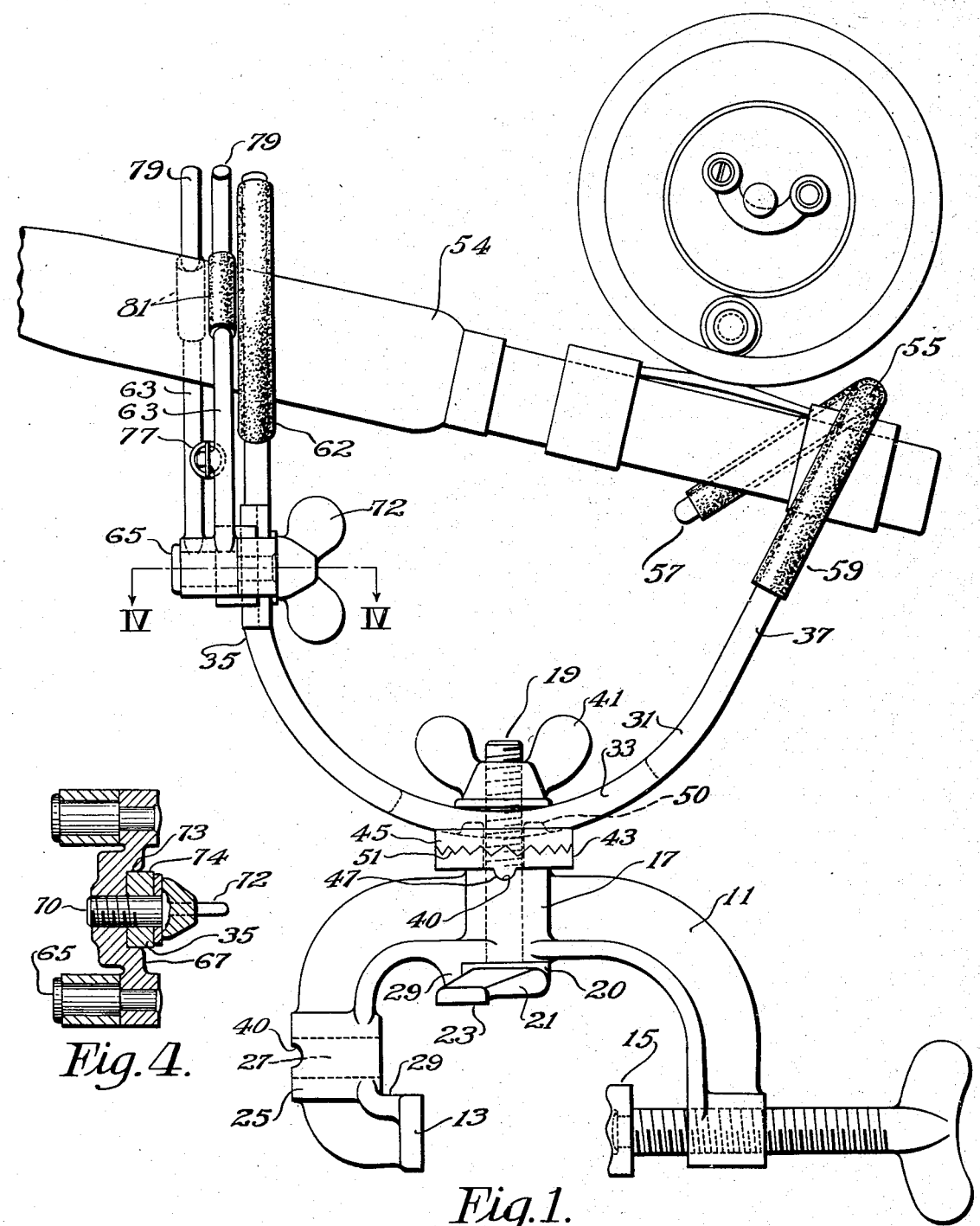
Figure 3:
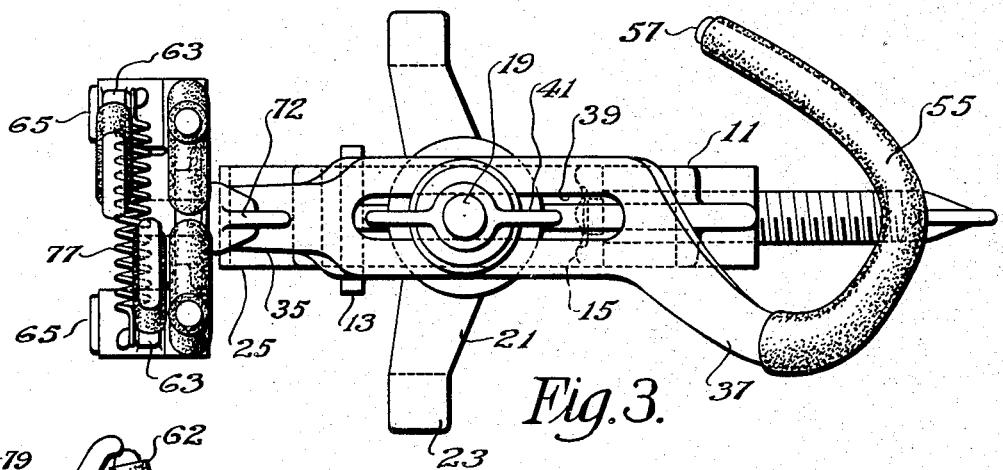
Figure 2:
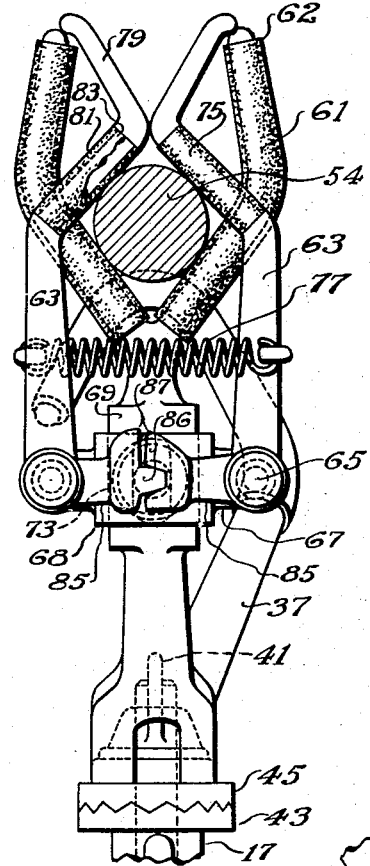
Figure 6:
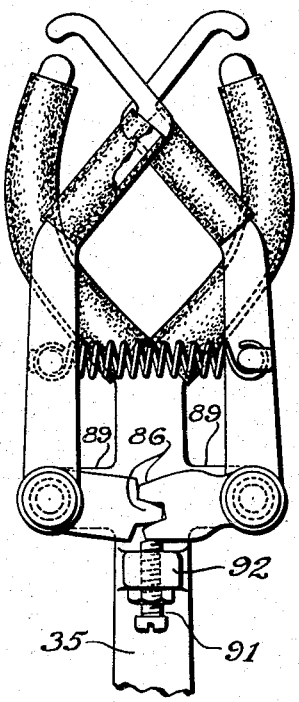
Figure 7:
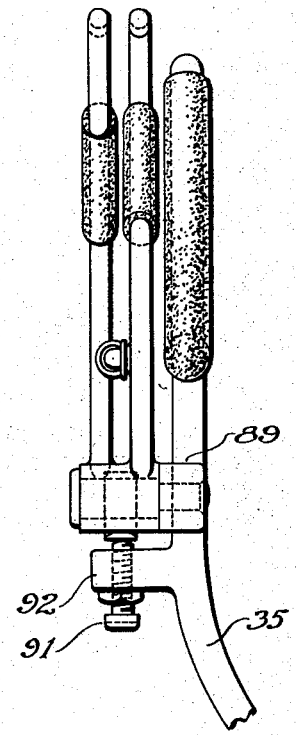
Figure 5:
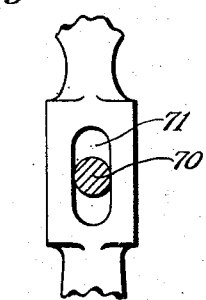
Figure 8:
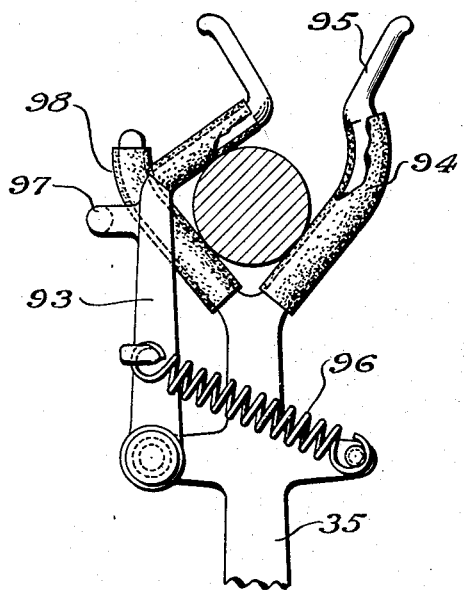
Figure 9:
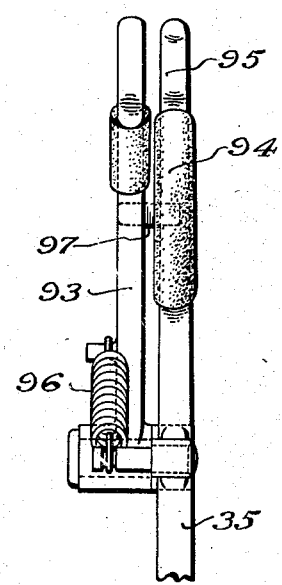
Figure 10:
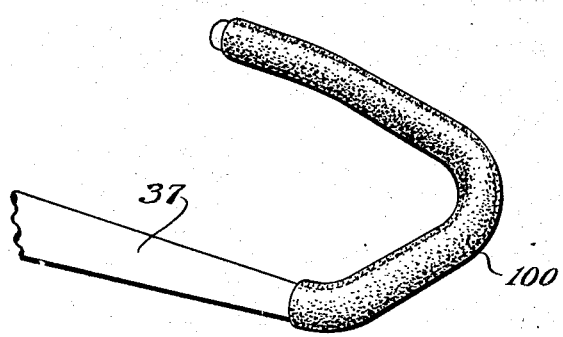

In the accompanying drawings which illustrate what is now considered to be the preferred form of the present invention, Fig. 1 is a side elevation of my improved fishing rod holder complete showing the butt end of a rod held therein; Fig. 2 is a front view, looking from the left in Fig. 1, of the front portion of the holder with the rod in section; Fig. 3 is a top plan view of the complete holder shown in Fig. 1, but without the rod; Fig. 4 is a horizontal sectional view on line 4—4 of Fig. 1, illustrating the construction of the parts to provide for adjustment for different diameters of rods; Fig. 5 shows in detail a portion of the front bracket with the slot and bolt for adjustment for rods of different diameters; Figs. 6 and 7 are front and side views respectively of a slightly modified construction of the rod supporting and clamping members at the front portion of the holder; Figs. 8 and 9 are front and side views respectively of still another modification of the front rod supporting and clamping members; and Fig. 10 is a top plan view of a modified form of the rear rod holding member.

The fishing rod holder illustrated in the drawings consists, generally speaking, of clamping means for securing the holder to the gunwale of a boat or other structure, a bracket adjustably secured to the clamping means to provide for varying angular positions of the rod both horizontally and vertically, and rod supporting and clamping devices on the bracket.

The clamping means for securing the holder to the boat, as shown in Figs. 1 and 3, consists of the U-shaped clamp 11 having the abutment 13 at one extremity and the screw clamp 15 at the other. A circular boss 17 in the clamp midway the extremities is provided with a central opening in which is received the threaded stud 19 having at its lower end a head 20 from the opposite sides of which extend the arms 21 with faces 23 to engage the top surface of the gunwale on each side of the holder and prevent any lateral tipping of the same. A similar boss 25 with central bore 27 is provided adjacent the abutment 13 to permit the U clamp 11 being secured to the boat in a vertical position, as distinguished from the horizontal position shown in Fig. 1, the stud 19 then being in the bore 27 and the other parts being as shown in said figure. Shoulders 29 adjacent the bosses are in position to engage the straight side face of the head 20, to maintain the stud in fixed angular position with the arms at right angles to the clamp 11.

The bracket 31 which carries the rod supporting devices consists of a middle arcuate section 33 and the front and rear generally vertical sections 35 and 37. The middle section 33 is formed with a longitudinal slot 39 through which passes the threaded upper end of stud 19 carrying the clamping wing nut 41. By adjusting the curved middle section 33 forward or back under the wing nut 41, the desired vertical tilt of the holder and rod may be secured.

A convenient form of clamping device to provide for the desired horizontal angular adjustment of the holder consists of the two disks 43 and 45, the lower disk 43 having a transverse rib 47 on its lower surface to take into a correspondingly shaped groove 49 in the outer surface of the boss to hold the disk for rotational movement, while the upper disk 45 is formed with a pair of upwardly extending projections 50 which are received in the slot 39 in the central portion 33 of the bracket 31, and prevent relative rotational movement between the disk and bracket. The adjacent faces of the two disks are notched or serrated as shown at 51 to prevent relative rotational movement between the disks when the wing nut 41 is screwed down on the bracket. By loosening the nut the bracket and upper disk may be turned to any desired angle horizontally, and at the same time adjusted as to tilt within the limits of the slot 39 in the bracket.

The fishing rod 54 is supported on the bracket by rod engaging members carried by the front and rear sections 35 and 37 of the bracket. On the front section there are provided a rod supporting member for carrying the weight of the rod and a rod clamping member for holding the rod securely in the supporting member without danger of displacement or loss of the rod in the event of a strike or the catching of a snag. Since the rear section of the bracket is subjected only to an upward strain from the end of the rod, a hold-down or inverted hook is all that is required such, for example, as the curved member 55 forming the end or extension of the rear section 37 of the bracket. Preferably the free down-turned end 57 of the members will be inclined forwardly, as shown in Fig. 1, to facilitate the positioning of the end of the rod in the hook. Also, the hook will be covered with rubber tubing 59 or other suitable material to prevent scarring of the finish on the rod and also to provide a friction surface which will tend to grip the rod and resist lengthwise movement of the rod therein.

The rod supporting member on the front section 35 of the bracket 31 comprises a forked or bifurcated extension of said section having the two arms diverging in substantially V-shape in their lower portions and slightly converging in their upper portions, the diverging lower portions forming a seat to receive and support the rod at its handle portion. Rubber tubing 62 or other protective covering on these arms prevents marring of the handle and also holds the rod more securely on the seat.

While the weight of the rod tends normally to hold the rod to its seat in the rod supporting member, there is danger when there is a sharp momentary tug on the line, as where a fish strikes hard and misses, or the hook catches momentarily on a snag, that the backward spring of the rod when the hook becomes free may throw the rod out of the supporting member with liability of its falling overboard and becoming lost. To guard against such accidental displacement of the rod, clamping means are provided which act normally to clamp the rod firmly against the seat in the supporting member, at the same time permitting the rod to be removed from the holder easily and quickly.

The preferred form of clamping means shown in the drawings comprises a pair of clamping members 63 pivotally supported on studs 65 secured in bosses or arms 67 extending laterally from opposite sides of the cross-head or block 68. This block is clamped to a face 69 on the lower end of the front portion 35 of bracket 31 by means of the threaded stud 70 fixed in the block and extending through slot 71 in the bracket 31 (see Fig. 5), and the clamping wing nut 72.

In order to maintain the block in proper angular position with its arms 67 extending at right angles to the bracket, the block is provided with the shoulder 73 which engages the sides 74 of portion 35 with a sliding fit. Thus the block and its pivoted clamping arms may be raised or lowered as desired while maintaining at all times proper angular positions.

The clamping or rod engaging faces of the clamping arms 63 are formed by the inwardly turned portions 75 which contact the upper surface of the rod or handle, as shown in Fig. 2, a spiral tension spring 77 connected at its opposite ends to the clamping arm 63 drawing these arms together and forcing the rod firmly against the seat with a wedging action.

The upper extremities 79 of the clamping arm 63 are bent outwardly to form cam faces for forcing the clamping arms apart by the downward movement of the rod when it is being inserted in the holder, also serving to guide the rod between the supporting arms 61.

To prevent marring of the fishing rod by the clamping members the inturned clamping portions are preferably covered with rubber tubing 81 or similar material which, by reason of its friction, tends to resist any upward movement of the rod which might result in dislodgment of the same from the holder. Preferably these portions 75 will be of reduced diameter as shown at 83, so that the surface of the rubber tubing will be flush with the adjacent surfaces of the arms, thus permitting the rod or handle to pass from the outwardly flaring portions 79 to the inwardly turned clamping portions 75 with a smooth and easy movement.

Preferably the outturned portions 79 of the clamping levers are not covered with rubber tubing or other material so that the rod will slide freely over the metal surface as it is pushed downwardly into the holder. Furthermore, since the rod, when it is being inserted in the holder, engages portions of the clamping members more distant from their pivots to force these members apart than when the rod is being removed from the holder, the greater leverage in the one case facilitates, and the less leverage in the other case resists, the movement of the rod into and out of supported position.

It is desirable to have the clamping arms move in unison and with uniformity, and accordingly these arms are provided at their pivotal ends with short, laterally extending arms 85 having gear segments 86 formed on their adjacent ends and engaging with one another so that the clamping arms will move toward and from each other in unison, and movement of the one arm will produce corresponding movement in the other.

To limit the approaching movement of the clamping arms 63 toward one another under the action of the tension spring 77, the gear segments 85 have been provided with the stop faces 87 which will contact with each other at the desired inward limit of movement of the arms.

In the modified construction shown in Figs. 6 and 7, the arms 89 upon which the clamping members are pivoted are formed integrally with the bracket so that no vertical adjustment to adapt the clamping for most efficient operation with varying sizes of rods is possible. However, by providing the adjustable stop screw 91 in the base 92, the limit of the closing movement of the clamping members may be varied, thus adapting the modified form for use with various rod diameters.

In the modification shown in Figs. 8 and 9, a single clamping member 93 has been provided and one of the arms 94 of the supporting member has been extended and turned outwardly to form a fixed rod guiding portion 95 which cooperates with the outwardly turned extremity of the single clamping member to guide the rod to the seat in the supporting member. Inward movement of the clamping member 93 under the tension of spring 96 is limited by the stop arm 97 engaging the arm 98 of the supporting member.

In order to provide for a wide range of diameters of butt end of the rod handle, the rear member 55 may be formed with a widely opening hook having a generally rounded shape at its rod engaging portion, as shown in Fig. 3. If it is desired to hold the butt end of the rod more firmly against lateral movement to position more certainly the tip of the rod, particularly with small diameter handles, the hook 100 may be modified as shown in Fig. 10, to a more nearly V-shape.

It will be noted that the front and rear portions 35 and 37 of the bracket are positioned well apart so that ample unobstructed space is provided between the front and rear rod supporting members, both above and below the rod, to permit the use in the holder of a rod equipped with a reel and at the same time providing room for the hand of the fisherman when inserting the rod in, or removing it from, the holder.

It will further be observed that because of the front support opening upwardly and the rear support downwardly, the instinctive and natural movement of the hand and wrist will tip the rod about a horizontal axis passing through the hand, thereby instantly disengaging the front of the rod handle from the front support and the butt end from the rear support, leaving the rod in the hand of the fisherman, free from the holder.

Similarly, in replacing the rod in the holder, the opposite motion of the hand and wrist will easily and quickly position the rod with the butt under the rear hook and the front of the handle in the seat in the supporting member.

In use the bracket will be mounted on the middle of clamp (as shown in Fig. 1) or on the end section, according to whether the clamp is to be mounted horizontally, as across the gunwale, or vertically as in an overhanging part or the edge of a thwart. The clamping members will be adjusted for the size of the rod, if needed, by loosening the wing nut 72 and moving the block and members up or down as required, after which the nut is tightened.

The rod may now be placed in the holder by first tilting the rod nearly vertically, then bringing the butt under the hook 55, and finally lowering the rod onto guiding faces 79 of the clamping members 63, which automatically open as the downward movement of the rod is continued until the rod rests upon the seat in the supporting member 61 and the clamping members close over its top.

The desired angular adjustment and tilt of the rod are then obtained by loosening the wing nut 41 and turning the bracket 31 and upper disk 45 to give the proper angularity, and sliding the bracket forward or back for the correct tilt, the parts being secured in position by tightening the wing nut.

With the modification shown in Figs. 6 to 9, the manner of use is substantially the same, except for the adjusting screw 91 of Figs. 6 and 7 which will be raised or lowered to secure the desired limit of closing movement of the clamping members.

While the present invention has been shown and described as embodied in a specific construction, it is to be understood that the invention is not limited thereto but may be embodied in other constructions and the form and arrangement of the several parts thereof may be varied within the limits defined by the appended claims.

What is claimed is:

1. A fishing rod holder having, in combination, a rod supporting member provided with spaced rod holding members, one of said members being a down turned hook to hold the butt end of the rod, and the other member having a rigid, upwardly open seat to support the rod, and a pair of pivoted clamping members each provided with inwardly and outwardly inclined rod engaging faces, to clamp the rod upon said seat and to cause the members to separate when the rod is inserted and removed from the holder, and resilient means for urging the clamping members toward each other.

2. A fishing rod holder having, in combination, a holding member for holding the butt of a rod and a rod clamping member comprising a V-shaped rod receiving seat, a pair of rigid pivotally mounted clamping members having angular rod engaging faces movable into and out of clamping position, certain portions of such faces forming a V to receive the rod and guide it to said seat when the rod is being inserted in the holder, and other portions forming an inverted V to clamp the rod to the seat, and resilient means normally tending to move the clamping members to bring said faces into clamping position and yielding to permit the clamping members to move to release the rod when the rod is raised against the last mentioned portion of said rod engaging faces.

3. A fishing rod holder having, in combination, a rod supporting member having a rod receiving seat and rod guiding means for guiding the rod to the seat, and a rigid rod clamping member pivotally mounted on the supporting member and provided with a rod clamping face to clamp the rod to said seat and with rod engaging means adapted to move the clamping face away from the seat by the action of the rod on said means as the rod is caused to approach the seat, and a spring for urging the clamping member and face toward the seat.

4. A fishing rod holder having, in combination, means for holding the butt of a rod, a rod supporting member, means carrying said holding means and supporting member, rod clamping members pivotally mounted upon said carrying means, said clamping members being connected together by gear segments, a spring for urging said members toward each other, and stop devices for limiting said movement.

5. A fishing rod holder having, in combination, a rigid, rod supporting member provided with a rod receiving seat, a rigid clamping member pivoted below the seat and having an inclined engaging face to engage the upper surface of the rod to clamp the latter to said seat, and a spring normally urging the rod clamping member in one direction to cause its inclined face to engage the rod and clamp it to said seat, and yielding to permit the member to be moved in the other direction by the action of the rod on the inclined face of the member when the rod is raised.

6. A fishing rod holder having, in combination, a rod supporting member provided with a rod receiving seat, a pair of rigid arms pivoted adjacent the supporting member and below the seat and having rod clamping faces upwardly and inwardly inclined towards one another and movable into engagement with opposite upper surfaces of the rod for holding the rod on the seat of the rod holding member, and resilient means for moving the clamping members into clamping position, said means yielding to permit the members to move apart by the action of the rod on the clamping faces when the rod is raised.

7. A fishing rod holder having, in combination, a holding member for the butt of a rod and rod supporting means including a rod receiving seat, a pair of rigid, pivotally mounted clamping members each having inwardly and outwardly inclined rod engaging faces with the inwardly inclined portions nearer the pivots forming the rod clamping faces, and the outwardly inclined portions farther from the pivots forming rod guiding faces, and resilient means tending to turn the clamping members toward one another and yielding by the action of the rod on the inclined faces to cause said members to separate when the rod is lowered or raised from the seat.

JOHN B. HADAWAY.